United States Patent [19]

Garner

[11] 4,037,300
[45] July 26, 1977

[54] DRILLING BIT BEARING STRUCTURE

[75] Inventor: Lloyd L. Garner, Los Alamitos, Calif.

[73] Assignee: Smith International, Inc., Irvine, Calif.

[21] Appl. No.: 673,391

[22] Filed: Apr. 5, 1976

Related U.S. Application Data

[62] Division of Ser. No. 546,936, Feb. 4, 1975, Pat. No. 4,021,084.

[51] Int. Cl.² .............................................. B21D 53/10
[52] U.S. Cl. ............................................... 29/148.4 R
[58] Field of Search ................ 29/148.4 R; 76/108 A; 175/371, 372; 308/8.2

[56] References Cited

U.S. PATENT DOCUMENTS

| | | | |
|---|---|---|---|
| 2,517,430 | 8/1950 | Hensel et al. | 308/239 |
| 2,592,277 | 4/1952 | Hammer | 175/371 |
| 2,595,904 | 5/1962 | Swart | 308/8.2 |
| 2,971,248 | 2/1961 | Kingsley et al. | 308/239 |
| 3,235,316 | 2/1966 | Whanger | 308/8.2 |
| 3,620,580 | 11/1971 | Cunningham | 308/8.2 |
| 3,823,030 | 7/1974 | Hudson | 175/372 |
| 3,866,987 | 2/1975 | Garner | 308/8.2 |
| 3,923,348 | 12/1975 | Peck | 308/8.2 |

*Primary Examiner*—Michael J. Keenan
*Attorney, Agent, or Firm*—Christie, Parker & Hale

[57] ABSTRACT

A rock drilling bit has a plurality of rolling cutters for pulverizing rock. The loads on the bearings between these cutters and their mounting pins are extreme and are carried by a friction bearing. The bearing surface in the cutter has a plurality of spaced apart pockets filled with a material harder than the carburized hardened steel of the balance of the bearing surface and having essentially zero ductility. Such a bearing surface is made by machining a plurality of shallow pockets in the cylindrical bearing surface either before or after carburizing. If formed before carburizing, the pockets are painted off to prevent carburizing in that area. Each of the pockets is then filled with the wear resistant hard material as a weld deposit. Finally, the steel body is hardened and the exposed steel portions of the bearing surface and wear resistant material are ground to form a finished bearing surface. Bearing life is increased substantially as compared with the best known prior bearing.

7 Claims, 4 Drawing Figures

DRILLING BIT BEARING STRUCTURE

CROSS REFERENCE TO RELATED APPLICATIONS

This is a division of application Ser. No. 546,936, filed Feb. 4, 1975, now U.S. Pat. No. 4,021,084.

BACKGROUND

In rock bits of the type commonly used in drilling oil and gas wells, for example, rock cutter cones are mounted on pins on the bit for pulverizing rock. High pressures are applied to such a rock bit and there are extreme loads on the bearing surfaces between the cone and leg. In some such rock bits the cones are mounted on the leg journal by a combination of anti-friction bearings using balls and rollers. In such an arrangement the space required for the rollers reduces the thickness of the cone and/or leg so that breakage sometimes occurs.

An alternative cone bearing structure particularly useful for extreme load bearing conditions has a combination of what are often considered friction and anti-friction bearings. A friction bearing indicates a structure where one material slides on another, usually with lubrication. These are referred to herein as solid journal bearings. Anti-friction bearings refer to bearings with rolling contact such as balls or rollers. In such a cone structure, the brunt of the radial load on the bearing is carried by the solid journal portion and thrust loads are partly accommodated by ball bearings that also serve to lock the cone on the leg bearing. A variety of approaches have been taken to the solid journal bearings to obtain prolonged life. The most usual approach is to provide uniformly hard bearing surfaces of high hardness. Typically the hardness is of the order of about Rockwell C60. Bearing surfaces of extremely hard material such as tungsten carbide have also been proposed.

In another embodiment the bearing surface in the steel body of the cutter cone is provided with a layer of aluminum bronze around the fully periphery. Such an embodiment has extremely long average life under the severe conditions encountered by rock bits.

Another approach is proposed in U.S. Pat. No. 3,235,316 issued Feb. 15, 1966, to J. R. Whanger. In accordance with that patent, the bearing surface in the cutter cone is hardened carburized steel with intermittent areas of soft anti-galling material such as certain silver alloys. The anti-galling material has a hardness very much lower than that of the carbonized steel.

Tests have been made of a cutter cone having a solid journal bearing surface in the cone formed entirely of a hard, wear resistant material welded in place on the steel body like the "hard facing" commonly used on various areas of well drilling tools. When successful, this bearing surface with a hard facing was found to give life comparable to that of aluminum bronze bearing surfaces when the bearing was lubricated in the normal manner. It was found to be significantly superior to bearings with aluminum bronze if the grease steel on the bearing failed, and the bearing was subjected to the types of abrasive present in well drilling operations. Hard facing has been applied uniformly to rock bit friction pins (see *Metals Handbook, Welding and Brazing*, Vol. 6, American Society for Metals, (1971) page 588).

Although the tests indicated superior performance by cone bearings having a surface of hard facing material, manufacture of satisfactory rock cutter cones with a hard facing on the bearing surface proved to be difficult, and there was an unacceptably high rejection rate. A reason for this lies in the almost zero ductility of the hard facing material and its susceptibility to cracking due to differential thermal expension during the heat treating operations on the cutter cone that must follow its deposition. It was not uncommon to form substantial cracks in the hard facing material which would propagate through the hardened steel cutter cone if the bit were put into service. Breakage of a cutter cone in service can cause significant delay in drilling operations. Attempts to use hard facing materials with low ductility in solid journal bearings of cutter cones have not been completely satisfactory.

In well drilling operations the life of the rock bit is of considerable importance. A substantial time may be involved in round tripping a drill string to change the bit. This is particularly true in deep holes where the time required to pull a drill string is rather long. It is, therefore, highly desirable to prolong the life of rock bits so that more rock can be drilled before it is necessary to change the bit. The bearings employed on such rock bits should have a substantial lifetime so that they do not fail before the bit becomes dulled and must otherwise be replaced. Even moderate increases in lifetime can amount to substantial cost savings.

BRIEF SUMMARY OF THE INVENTION

There is, therefore, provided in the practice of this invention according to a presently preferred embodiment, a solid journal bearing having extreme load capacity between a pair of members, one of which rotates relative to the other. At least one of these members has a body of hardened carburized steel with a plurality of mutually spaced apart shallow pockets extending from the bearing surface thereof. Each of these pockets is filled with a wear resistant material harder than the hardened carburized steel and having low ductility. Preferably, the pockets are filled with the wear resistant material by welding after the adjacent surfaces of the bearing above have been carburized. The steel body is then hardened in a manner appropriate for that steel, and the wear resistant material and steel bearing surface are ground to form a smooth finished bearing surface.

DRAWINGS

These and other features and advantages of the present invention will be appreciated as the same becomes better understood by reference to the following detailed description of a presently preferred embodiment when considered in connection with the accompanying drawings, wherein.

DESCRIPTION

Figure 1:
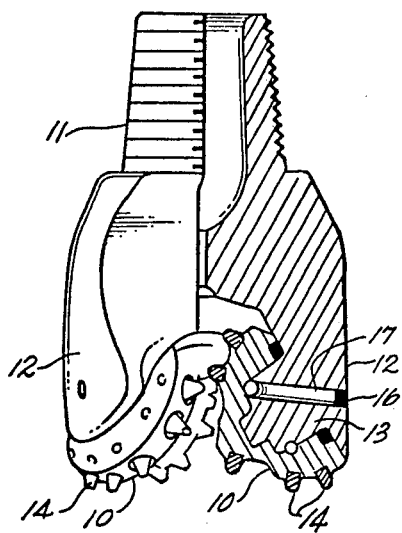
FIG. 1 is a pictorial view partly cut away of a rock bit having three cutter cones mounted thereon by solid journal bearings constructed in accordance with principles of this invention.

FIG. 1 illustrates in a cutaway side view a rock bit having three cutter cones 10 mounted thereon. The bit has a heavy duty steel body with a threaded pin joint 11 at one end. The main body of the bit is divided into three legs 12, each terminating in a journal 13 on which the respective cutter cone is mounted. Typically, the cutter cones have sintered metal carbide inserts 14 on their outer surfaces for contacting the rock when the bit is used and effecting the principal pulverization of the rock. Many conventional arrangements for such inserts are well known in the art. Indications of such inserts are, therefore, omitted in FIGS. 2 and 3.

FIG. 1 also illustrates another conventional element of such a rock bit, namely a ball passage 16 from the exterior of the leg to a ball bearing race on the pin. When the bearing is assembled into a completed assemblage as described in greater detail hereinafter, ball bearings are added through the passage 16 which is then closed with a ball plug 17 which retains the balls in place. Typically, the ball plug is welded in place after the balls are inserted. Typically, the rock bit also incorporates a grease reservoir (not shown) for maintaining a supply of grease in the bearing between the pin and cutter cone.

Figure 2:
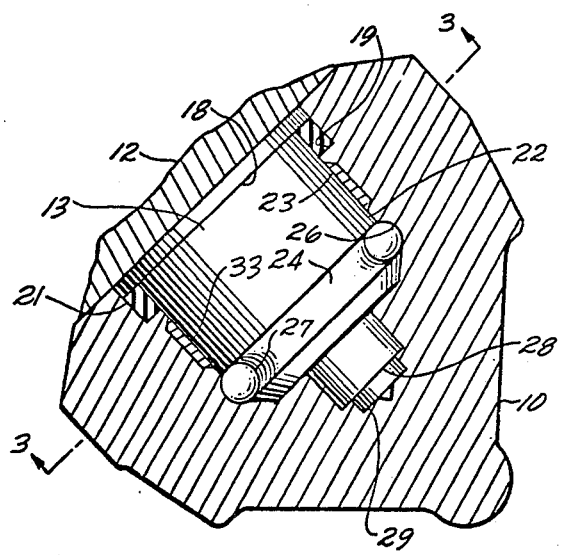
FIG. 2 is a longitudinal cross section through one of the bearings.
Figure 3:
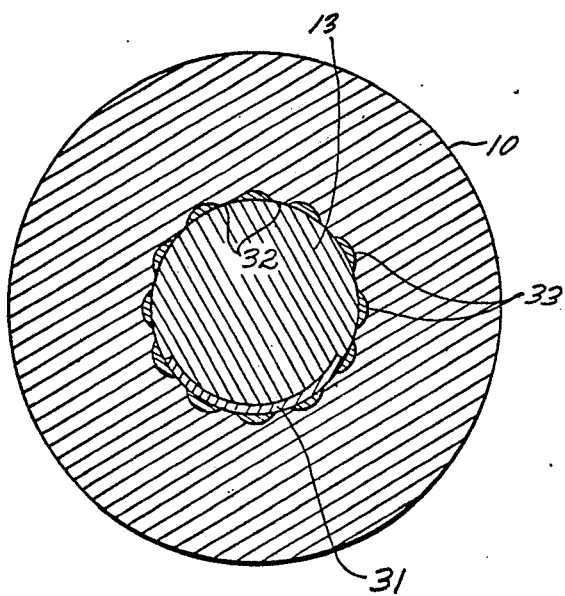
FIG. 3 is a transverse cross section through the bearing of FIG. 2.

FIG. 2 is a longitudinal cross section of a typical journal 13 and cone 10 incorporating a solid journal bearing constructed according to principles of this invention. FIG. 3 is a transverse cross section through this journal and cone at line 3—3 of FIG. 2.

The journal has a shoulder 18 near the leg 12 spaced apart from an internal shoulder 19 in the hollow cutter cone. This provides a space for a conventional grease seal 21. The journal has a cylindrical bearing surface 22 mating with a cylindrical bearing surface 23 in the cone. Ball races 24 and 26 are provided on the journal and in the cone respectively. These races are filled with a plurality of ball bearings 27 which carry some radial thrust load between the journal and cone. The ball bearings also serve to retain the cone on the journal. A nose bearing 28 on the journal engages a thrust button 29 in the cone for carrying the principal thrust loads of the bearing structure. The brunt of the radial loads between the cone and journal are carried by the main cylindrical bearing surfaces 22 and 23. The solid journal bearing and ball bearing are lubricated by conventional grease retained by the seal 21.

Very heavy drilling weights are commonly used with rock bits and the loads must largely be carried as radial loads on the main bearing surfaces 22 and 23 of the journal and cone. This involves extreme loads and requires high bearing capacity for long life under these adverse conditions. Elevated temperatures are often encountered as well. The bearing surface 22 on the journal is preferably hardened high strength alloy steel which may be carburized to obtain a high surface hardness while retaining strength and ductility. In this embodiment a layer of hard facing material 31 is provided on that part of the bearing surface subjected to the highest loads. Thus, as best seen in FIG. 3, the hard facing layer 31 extends about 120° around the bearing surface 23 and is about 3/32 inch thick.

Typically, the hard facing material 31 on the journal is a cobalt base alloy, the nominal composition of which is about 26% chrominum, 14% tungsten, 4% iron, 3.25% carbon, 0.75% silicon, and a balance primarily of cobalt.

A number of other hard facing compositions, as will be apparent to one skilled in the art, may also be employed. Particularly suitable are alloys in Group 4A listed on page 155 of *Metals Handbook*, ibid. The hard facing material is preferably laid into a depressed area of the journal by a conventional welding technique common to many hard facing materials and then ground to form the final bearing surface. Either gas or arc welding can be used under appropriate conditions. Several suitable welding techniques are described in the *Metals Handbook*, ibid.

The bearing surface 23 in the cone is of considerable importance, since cracks initiated at this surface can propagate to the ball race and exterior of the cone, resulting in loss of the cone from the leg journal. When this occurs in a well, it can involve substantial difficulty and expense in remedying the problem. There is, therefore, provided in practice of this invention a solid journal bearing surface having excellent wear life and substantial resistance to cracking. The bearing surface in the cone has areas 32 (FIG. 4) of hardened carburized steel integral with the main body of the cone. There are also a plurality of separate areas 33 of hard facing material having a higher hardness than the hardness of the carburized steel and low ductility. By providing a plurality of separated extra hard, albeit brittle, areas on the bearing surface, an improved bearing life is obtained.

Typically, the cutter cone is made of a carburizing grade of high strength alloy steel such as AISI 3310, AISI 4620, AISI 4815, AISI 4820, AISI 8720 or AISI 9310, for example. These materials are readily gas carburized to substantial depths and are, therefore, used for rock cutter cones. After suitable heat treatment, the uncarburized steel may have a hardness of about Rockwell C40 and the carburized surfaces may be in the range of from about Rockwell C57 to Rockwell C62. These latter are typical hardnesses in the hardened carburized areas 32 of the bearing surface in the cone.

Figure 4:
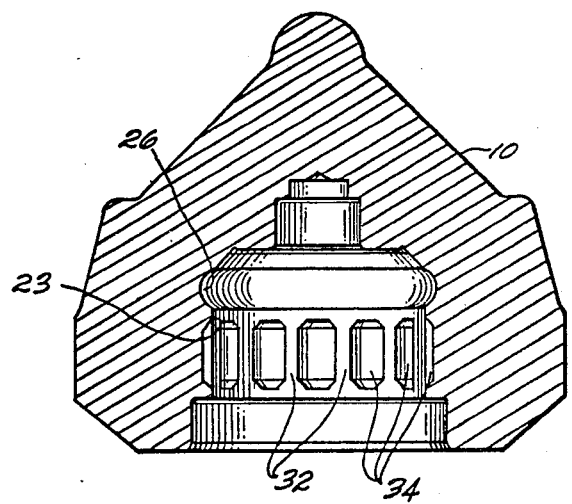
FIG. 4 is a longitudinal cross section of a cutter cone having a solid journal bearing in an intermediate stage of manufacture.

The harder areas 33 in the bearing surface in the cutter cone are provided by depositing a conventional hard facing material in the cone. FIG. 4 illustrates in longitudinal cross section a cutter cone blank prior to this intermediate stage in manufacture. The interior surfaces of the cone are rough machined to approximately their final dimensions, leaving some metal for finishing operations. A plurality of pockets 34 are machined into the bearing surface 23 of this rough blank. The pockets may be formed either before or after carburizing the blank. Thus, for example, the pockets 34 may be milled in the blank bearing surface 23. The pockets are then printed with a conventional ceramic "stop off" material that is resistant to carburizing conditions. The blank is then gas carburized in a conventional manner so that areas (such as the spaces 32 between the pockets) not covered with stop off, recess a carburized case. The area of the pockets is then sandblasted to remove the stop off material for subsequent welding operations. Alternatively, the blank can be carburized before the pockets are formed, and then the pockets are machined in the carburized surface. Such a technique can be used to avoid problems due to incomplete stopping off of areas where carburization is not desired.

Whichever technique is used, the resulting blank bearing surface 23 is carburized in the regions 32 between the pockets 34, which are not carburized. Typically, these pockets are about 0.080 inch deep with an inside radius of about ¼ inch giving them a width on the bearing surface of about ⅜ inch. Twelve such pockets may be formed in a bearing surface having an inside diameter of about 2.1 inch. The pockets are preferably rounded to make welding easier and minimize stress concentrations.

The pockets 34 formed in the bearing surface of the blank are then are welded full of hard facing material. A typical hard facing material has a nominal composition of about 17% chromium, 16% molybdenum, 6% cobalt, 3% carbon, 1.9% vanadium, 1.5% silicon, 1% maganese, and a balance of iron with up to about 3% of other materials. A variety of other hard facing alloys are described in the *Metals Handbook*, ibid, and may be employed on the bearing surface. Preferably, the hard facing is a high alloy content iron base alloy, that is, at least 50% iron, to more closely resemble the carburized steel. This gives better bearing characteristics against the cobalt base hard facing 31 on the journal than does a cobalt base alloy in the pockets. The hard facing material typically has a hardness of about Rockwell C62 to C63. Such material has very low ductility and is susceptible to cracking due to differential thermal expansion during subsequent heat treatment of the cutter cone. By depositing the hard facing material in isolated pockets in the bearing surface of the cutter cone, any tendency of the hard facing to crack with sufficient severity to damage the cone, is largely inhibited Minor cracks in the hard facing after the treatment are sometimes observed. Major cracking initiating in the hard facing with sufficient severity to destroy a cone are rarely observed.

It is desirable to have the largest possible area of the bearing surface formed of the hard facing material for best bearing life. It is important, however, to separate the hard facing material into a plurality of separate inserts separated by the hardened steel of the cutter cone. This isolation of the brittle hard facing material enables one to tolerate minor cracking in the hard facing without significant detriment to bearing life.

After the blank has been completed and hardened, the rough bearing surface 23 is ground to produce the final bearing surface. This final grinding removes some of the hard facing material in the pockets and a few thousandths of an inch of the carburized case in the intermediate areas 32 in the cutter cone. Insufficient material is ground from the carburized steel to cause any substantial reduction in surface hardness. Thus, the finished friction bearing surface is partly hardened carburized steel having a hardness in the range of about Rockwell C57 to C62. The surface has a plurality of mutually spaced apart areas of Haynes 93 having a hardness of about Rockwell C62 to C63.

An excellent solid journal bearing for well drilling rock bits for service in extreme down-hole conditions of pressure and temperature has a journal as hereinabove described and a main bearing surface in the cone having a continuous layer of aluminum bronze cast in place and machined to form the final bearing surface. Comparative tests in actual down-hole drilling with both types of bearing on the same bit have shown a significant increase life for the improved solid journal bearing with hard facing areas as compared with the prior aluminum bronze bearing.

In an exemplary embodiment, the cutter cone is rough machined from high strength alloy steel to a blank as illustrated in FIG. 4. The interiors of the pockets 34 are painted with stop off to prevent carburization (in some embodiments, other areas on the exterior of the cone may also be stopped off). The blank is then gas carburized to produce a deep case and slowly cooled. This leaves the blank relatively softened for machining. The blank is then sandblasted to remove the stop off material, particularly in the pockets so that they are clean for welding. Hard facing is applied in the pockets as a weld deposit by arc welding. Thus, the inserts of hard facing are integral with the steel of the blank.

The exterior of the cutter cone blank is formed to its final configuration either before or after the hard facing is applied. The blank is then quenched and tempered in a conventional manner for carburized steel. The hard facing material in the pockets 34 is rough ground so that the blank can be temporarily supported by its bore for machining operations on the exterior. At this point, the bearing surface is preferably inspected by a conventional dye penetrant or fluorescent dye penetrant to assure that there is no significant cracking of the hard facing material due to the hardening operation on the steel blank.

As mentioned above, many rock cutter cones have inserts of sintered tungsten carbide or the like on the exterior surface for pulverizing the rock. Such inserts are mounted after the above-mentioned machining and heat treating operation. Holes are drilled in the exterior surface of the blank and tungsten carbide inserts are pressed in with an interference fit. The stresses introduced by such operations cause a slight growth of the inside diameter and may cause cracking if it is incipient. After the inserts have been pressed into position, the bore of the blank is finish ground to the final dimensions. This includes shallow grinding of the hard facing material in the pockets and carburized steel therebetween. A final dye penetrant inspection or fluorescent dye penetrant inspection is preferably made at this time. Tiny cracks in the hard facing material can be tolerated, but large cracks would be a cause for rejection.

Although limited embodiments of solid journal bearing structure for extreme load conditions have been described and illustrated herein, many modifications and variations will be apparent to one skilled in the art. Thus, for example, preformed inserts of hard facing material such as cemented metal carbides can be bonded in place in the pockets. Such inserts and the brazing material or other bonding agent for holding the inserts in place must withstand any subsequent heat treatment of the cutter cone. Alternatively, such inserts could be bonded in place by a technique that does not damage previous heat treatment. Either of these amounts to a stringent requirement that is not readily met for metal carbide inserts. Use of a hard facing material laid in place by welding as hereinabove described is, therefore, preferred.

It will also be noted that isolated areas of hard facing material can be employed on the leg journal as well as on the bearing surface in the cone. Such a construction is also useful in other structures where solid journal bearings must sustain extremely high bearing loads. Such a construction can be used, for example, in the nose bearing of the cutter cone. The geometry of the pockets in which the hard facing material is deposited can differ appreciably from the rounded pockets hereinabove described and illustrated. These preferred pockets are desirable because of the ease of machining on a milling machine, and freedom from sharp corners, but other pocket configuration are also acceptable. It is preferred that the pockets be substantially free of sharp corners because of difficulty of assuring good weld penetration and the tendency of such corners to concentrate stresses. Many other modifications and variations will be apparent to one skilled in the art, and it is therefore to be understood that within the scope of the appended claims, the invention may be practiced otherwise than as specifically described.

What is claimed is:

1. A process for forming an improved bearing surface in a rock bit cutter cone of high strength alloy steel, the bearing surface having spaced portions of hard-facing alloy with increased resistance to formation of cracks and propagation of cracks into and through the cone, comprising steps of:
   forming a cutter cone blank of high strength alloy steel;
   forming a cylindrical blank bearing surface in a bore of the cutter cone blank;
   forming a plurality of shallow pockets spaced apart from each other in the cylindrical blank bearing surface;
   filling each of the pockets with a wear resistant hard-facing alloy having a hardness greater than the hardness of the alloy steel when carburized and hardened; and
   grinding the hard-facing alloy and blank bearing surface to form a finished bearing surface;
   the resulting composite bearing surface being characterized by a decreased tendency, as compared to a continuous ring of hard-facing alloy, to form large propagating cracks in the individual portions of hard-facing alloy.

2. A process as defined in claim 1 further comprising the step of hardening and tempering the cutter cone blank after the filling step.

3. A process as defined in claim 2 further comprising the step of carburizing the steel of the blank bearing surface before the filling step.

4. A process as defined in claim 3 further comprising the step of inserting hard metal carbide inserts into holes on the exterior of the cutter cone after the hardening and tempering step.

5. A process as defined in claim 1 further comprising the step of carburizing the steel blank bearing surface before the filling step.

6. A process as defined in claim 1 wherein the filling step comprises welding an iron base hard facing alloy in each of the pockets.

7. A process as defined in claim 1 wherein each of the shallow pockets is rounded with an axis parallel to the axis of the cone and a radius appreciably smaller than the radius of the cylindrical blank bearing surface.

* * * * *

UNITED STATES PATENT AND TRADEMARK OFFICE
CERTIFICATE OF CORRECTION

PATENT NO. : 4,037,300
DATED : July 26, 1977
INVENTOR(S) : Lloyd L. Garner

It is certified that error appears in the above-identified patent and that said Letters Patent are hereby corrected as shown below:

Column 1, line 41, "fully" should be full;
          line 50, "carbonized" should be -- carburized --;
          line 60, "steel" should be -- seal --;
          line 62, -- materials -- should be inserted after "abrasive" and before "present".

Column 2, line 6, "expension" should be -- expansion --;
          line 9, "would" should be -- could --;
          line 42, "above" should be deleted.

Column 3, line 36, -- load and some -- should be inserted before "thrust".

Column 4, line 19, "separate" should be -- separated --;
          line 51, "recess" should be -- receive --.

Column 5, line 2, "are" second occurrence, should be -- arc --.
          lines 5 & 6, "maganese" should be -- manganese --;
          lines 54 & 55, "increase" should be -- increased --.

Column 6, line 60, "configuration" should be -- configurations --

*Signed and Sealed this*

*Twenty-fifth* Day of *October 1977*

[SEAL]

Attest:

RUTH C. MASON
*Attesting Officer*

LUTRELLE F. PARKER
*Acting Commissioner of Patents and Trademarks*